United States Patent
Miyoshi et al.

(10) Patent No.: US 7,500,136 B2
(45) Date of Patent: Mar. 3, 2009

(54) REPLACING MEMBER DISKS OF DISK ARRAYS WITH SPARE DISKS

(75) Inventors: Hiroyuki Miyoshi, Kanagawa-ken (JP); Miwa Yohichi, Kabnagawa-ken (JP); Aya Ninami, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 444 days.

(21) Appl. No.: 11/446,720

(22) Filed: Jun. 5, 2006

(65) Prior Publication Data
US 2007/0294567 A1 Dec. 20, 2007

(51) Int. Cl.
*G06F 11/00* (2006.01)
(52) U.S. Cl. .......................................... 714/6
(58) Field of Classification Search .................. 714/2–7, 714/13, 15, 16, 27, 39, 42, 54
See application file for complete search history.

(56) References Cited

U.S. PATENT DOCUMENTS

| 7,313,721 | B2 * | 12/2007 | Ashmore | 714/7 |
|---|---|---|---|---|
| 2004/0162940 | A1 * | 8/2004 | Yagisawa et al. | 711/114 |
| 2004/0250161 | A1 * | 12/2004 | Patterson | 714/6 |
| 2005/0240854 | A1 * | 10/2005 | Nakagawa et al. | 714/758 |
| 2005/0283655 | A1 * | 12/2005 | Ashmore | 714/7 |
| 2006/0023595 | A1 * | 2/2006 | Erickson et al. | 369/53.2 |

FOREIGN PATENT DOCUMENTS

| JP | 11-345095 | 12/1999 |
|---|---|---|
| JP | 2004-021318 | 1/2004 |
| JP | 2004-213441 | 7/2004 |

* cited by examiner

*Primary Examiner*—Nadeem Iqbal

(57) ABSTRACT

Member disks of a hard disk drive array are replaced with spare disks. First, a member disk of an array of member disks is replaced with a spare disk. The reliability factor of the member disk is lower than the reliability factor of the array, and the reliability factor of the spare disk is equal to or higher than the reliability factor of the array. Second, a member disk of an array of member disks is replaced with a spare disk. The reliability factor of the member disk is higher than the reliability factor of the array and is higher than the reliability factor of the spare disk. The reliability of the spare disk is equal to or higher than the reliability factor of the array.

20 Claims, 6 Drawing Sheets

REPLACING MEMBER DISKS OF DISK ARRAYS WITH SPARE DISKS

FIELD OF THE INVENTION

The present invention relates generally to disk arrays having member disks, and more particularly to replacing member disks of such disk arrays with spare disks.

BACKGROUND OF THE INVENTION

Information is commonly stored on hard disk drives. To ensure that the information is stored in a reliable manner, arrays of hard disk drives are commonly employed. For instance, an array of hard disk drives may be organized in a redundant array of independent disks (RAID) methodology. For example, the RAID-5 methodology provides for fault tolerance while striping data among the member disks of a hard disk drive array.

The controller for a hard disk drive array in a storage subsystem typically determines the reliability of all the member disks of a hard disk drive array. For instance, this reliability may be based on the recoverable error record of each member disk of the array on a regular basis. To ensure reliability of the storage subsystem, when the reliability of a member disk is less than a given threshold, the disk may be removed from the array and temporarily employed as a spare disk.

However, this common approach to ensure storage subsystem reliability is disadvantageous. In particular, the reliability of the storage subsystem is inversely proportion to the utilization of the member disks of the array. If the reliability threshold of the member disks is increased, more frequent disk replacement occurs, which results in increased maintenance costs. If the reliability threshold is decreased, however, the reliability of the storage subsystem-itself suffers.

SUMMARY OF THE INVENTION

The present invention relates to replacing member disks of a hard disk drive array with spare disks. The present invention introduces a reliability factor for each hard disk drive array. The reliability factor of each array is determined by an administrator, or other user, as the desired reliability of the array. A method of one embodiment includes the following. First, a member disk of an array of member disks is replaced with a spare disk. The reliability factor of the member disk is lower than the reliability factor of the array, and the reliability factor of the spare disk is equal to or higher than the reliability factor of the array. Second, a member disk of an array of member disks is replaced with a spare disk. The reliability factor of the member disk is higher than the reliability factor of the array and is higher than the reliability factor of the spare disk. The reliability of the spare disk is equal to or higher than the reliability factor of the array.

A system of an embodiment of the invention includes at least two arrays of member disks. Each array has a different reliability factor and each member disk of each array has a reliability factor. The system includes one or more spare disks, each of which also has a reliability factor. A controller is to perform the method described above for each array of member disks.

An article of manufacture of an embodiment of the invention includes a tangible computer-readable medium, and means in the medium. The tangible computer-readable medium may be a recordable data storage medium, or another type of tangible computer-readable medium. The means is for performing the method described above.

Embodiments of the invention provide for advantages over the prior art. With respect to replacing a member disk of an array with a spare disk, where the reliability factor of the member disk is lower than the reliability factor of the array, and the reliability factor of the spare disk is equal to or higher than the reliability factor of the array, the following is achieved. Particularly, the reliability of the array is increased, by ensuring that a more reliable spare disk replaces a less reliable member disk. The less reliable member disk becomes a new spare disk.

With respect to replacing a member disk of an array with a spare disk, where the reliability factor of the member disk is higher than the reliability factor of the array and than the reliability factor of the spare disk, and where the reliability of the spare disk is equal to or higher than the reliability factor of the array, the following is achieved. Particularly, because the member disk has higher reliability than the array, replacing it with a spare disk that has at least the same reliability as the array does, but is less reliable than the member disk, still maintains the overall reliability of the array. However, the result is that the member disk becomes a new spare disk that has a higher reliability than before.

Still other advantages, aspects, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
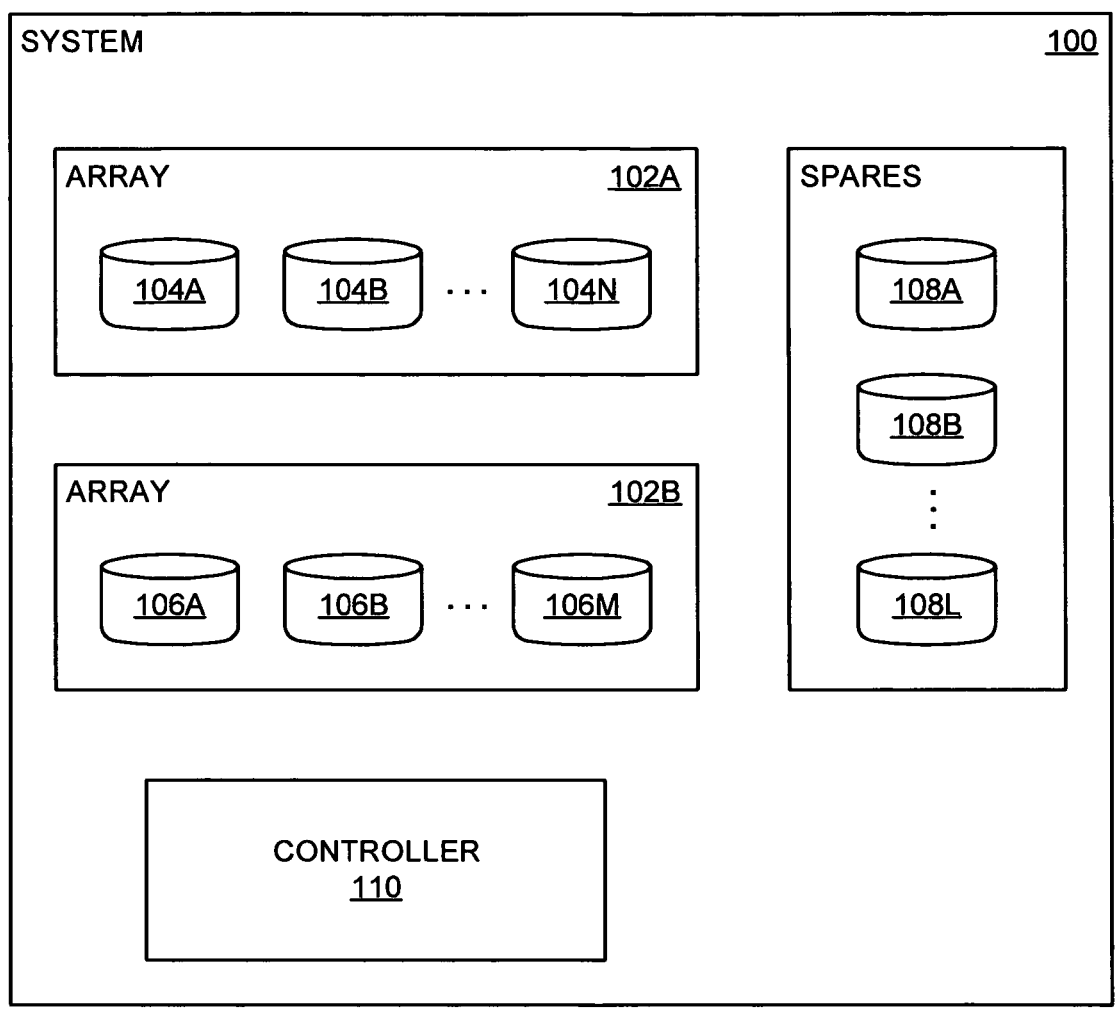
FIG. 1 is a diagram of a system, according to an embodiment of the invention.

FIG. 1 shows a system 100, according to an embodiment of the invention. The system 100 includes two hard disk drive arrays 102A and 102B, collectively referred to as the arrays 102. While two arrays 102 are shown in FIG. 1, in other embodiments there may be more than two of the arrays 102. The arrays 102 may be organized according to a redundant array of independent disks (RAID) methodology, such as the RAID-5 methodology known within the art.

The array 102A is made up of member disks 104A, 104B, . . . , 104N, collectively referred to as the member disks 104, whereas the array 102B is made up of member disks 106A, 106B, . . . , 106M, collectively referred to as the member disks 106. There are at least two member disks 104 and at least two member disks 106. The number of disks 104 can be equal to or different than the number of disks 106. Each of the disks 104 and 106 may be a hard disk drive.

The system 100 also includes a number of spare disks 108A, 108B, . . . , 108L, collectively referred to as the spare disks 108. There is at least one of the spare disks 108. Each of the spare disks 108 may be a hard disk drive. The spare disks 108 may be hot spares, in that they are each able to replace one of the member disks 104 and 106 of the arrays 102 without taking the arrays 102 offline. That is, the arrays 102 can be accessed, such that data can be written to and read from the arrays 102, while their member disks 104 and 106 are replaced with the spare disks 108.

The system 100 also includes a controller 110. The controller 110 may be implemented in software, hardware, or a combination of software and hardware. The controller 110 is responsible for maintaining the arrays 102, and for replacing the member disks 104 and 106 with the (hot) spare disks 108 as needed, in accordance with at least one of two different approaches as described later in the detailed description. The controller 110 can also be responsible for determining the reliability of each of the arrays 102, and each of the disks 104, 106, and 108.

Each of the arrays 102, and each of the disks 104, 106, and 108, thus has a reliability factor. The reliability factor is a parameter of an array or of a disk that is indicative of the reliability of the array or of the disk. The reliability factor is determined for each disk in a conventional manner. For instance, the recoverable error record of each disk may be acquired to determine the reliability factor of the disk. The reliability factor of each array itself is determined by an administrator, or other user, as the desired reliability of the array. The disks of each array are then replaced with spare disks, as will be described, as needed to maintain the reliability factor of the array. Replacement in this context preferably means hot swapping, so that physical disconnection and physical reconnection is not needed of any disk. That is, the swapping that is performed is desirably a logical reassignment of disks within a storage subsystem, as opposed to a physical reassignment of disks.

Two different approaches are now described by which a member disk of an array is replaced with a spare disk. Embodiments of the invention can employ either of these approaches, or both of these approaches, to replace member disks of arrays with spare disks. These approaches are described in relation to each disk and each array having one of three reliability factors: high, medium, and low. However, disks and arrays having one of three such reliability factors are described just for example purposes, and embodiments of the invention are not limited to just these reliability factors.

Figure 2:
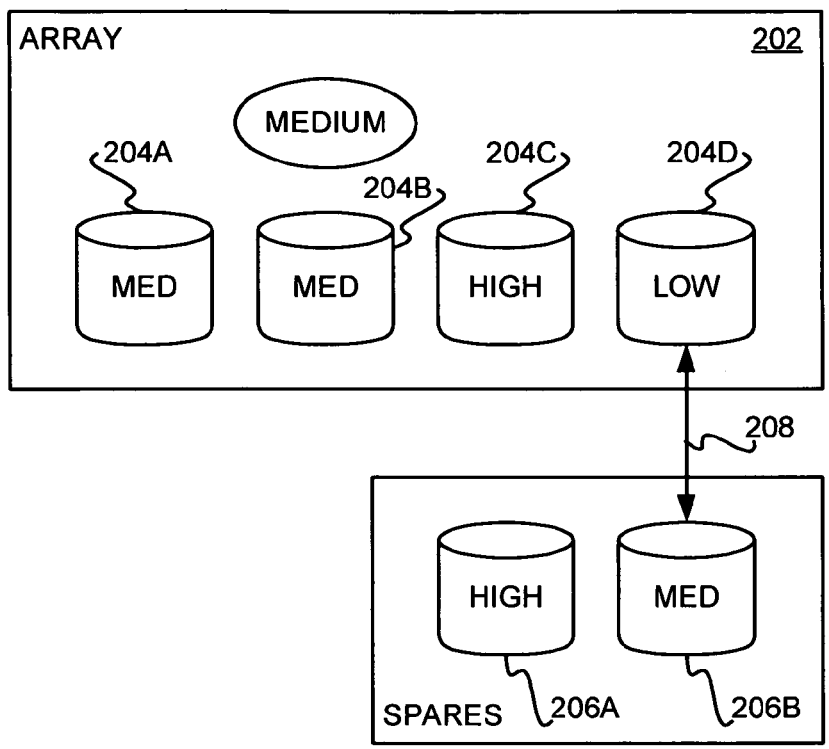
FIG. 2 is a diagram depicting a first approach for replacing a member disk of an array with a spare disk, according to an embodiment of the invention.

FIG. 2 illustratively depicts a first approach to replacing a member disk of an array with a spare disk, according to an embodiment of the invention. In this first approach, the member disk being replaced has a lower reliability factor than the array of which it is a part does. Furthermore, the reliability of the spare disk replacing the member disk is equal to or higher than the reliability factor of the array itself. The replaced member disk becomes a new spare disk, whereas the replacing spare disk becomes a new member disk of the array.

A hard disk drive array 202 is shown that includes four member disks 204A, 204B, 204C, and 204D, collectively referred to as the member disks 204. The array 202 has a reliability factor of medium. The member disks 204 have reliability factors of medium, medium, high, and low, respectively. There are two spare disks 206A and 206B, collectively referred to as the spare disks 206. The spare disks 206 have reliability factors of high and medium, respectively.

As depicted by the arrow 208, the member disk 204D is replaced with the spare disk 206B within the array 202. The member disk 204D has a reliability factor of low that is lower than the reliability factor of medium of the array 202 itself. The spare disk 206B, by comparison, has a reliability factor of medium that is equal to or higher than the reliability factor of medium of the array 202 itself. Therefore, replacing the member disk 204D with the spare disk 206B can be considered as improving the reliability of the array 202 itself, since the reliability of the spare disk 206B is at least as great as the reliability of the array 202. The member disk 204D becomes a new spare disk.

It is noted that in one embodiment, as depicted in FIG. 2, the spare disk that replaces the member disk 204D is the spare disk 206B instead of the spare disk 206A. Both the spare disks 206 have reliability factors equal to or greater than the reliability factor of the array 202. However, preference is given to the spare disk that has a reliability factor equal to that of the array 202 or, secondly, that is least higher than the reliability factor of the array 202. Of the two spare disks 206, the reliability factor of the spare disk 206B is equal to that of the array 202, whereas the reliability factor of the spare disk 206A is greater than that of the array 202. Therefore, preference is given to the spare disk 206B replacing the member disk 204D, instead of the spare disk 206A replacing the member disk 204D.

Figure 3:
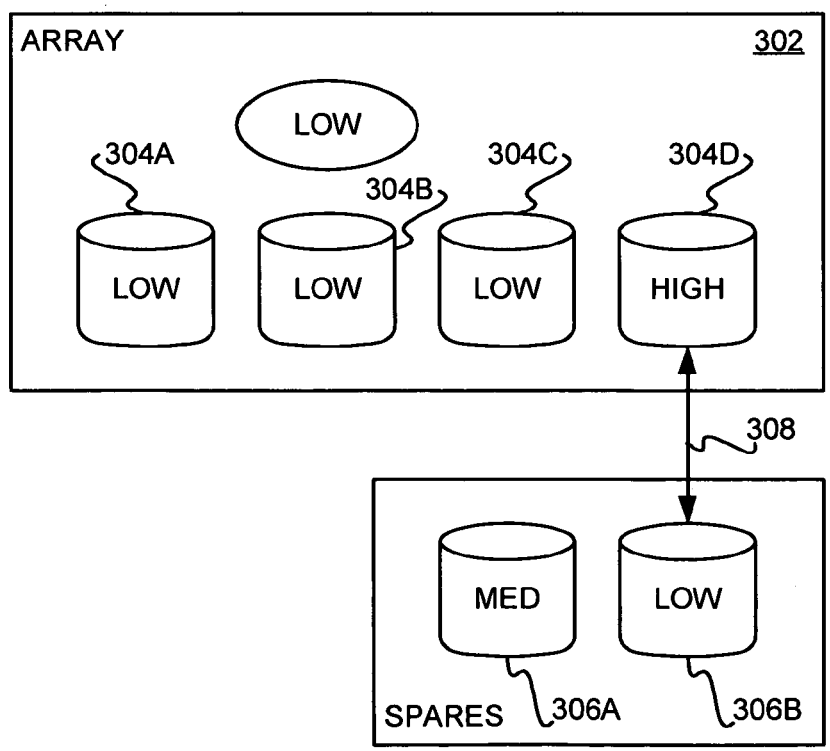
FIG. 3 is a diagram depicting a second approach for replacing a member disk of an array with a spare disk, according to an embodiment of the invention.

FIG. 3 illustratively depicts a second approach to replacing a member disk of an array with a spare disk, according to an embodiment of the invention. In this second approach, the member disk being replaced has a higher reliability factor than the array of which it is a part does, and has a higher reliability factor than the spare disk replacing this member disk. Furthermore, the reliability of the spare disk replacing the member disk is equal to or higher than the reliability factor of the array itself, as before. The replaced member disk becomes a new spare disk, whereas the replacing disk becomes a new member disk of the array.

A hard disk drive array 302 is shown that includes four member disks 304A, 304B, 304C, and 304D, collectively referred to as the member disks 304. The array 302 has a reliability factor of low. The member disks 304 have reliability factors of low, low, low, and high, respectively. There are two spare disks 306A and 306B, collectively referred to as the spare disks 306. The spare disks 306 have reliability factors of medium and low, respectively.

As depicted by the arrow 308, the member disk 304D is replaced with the spare disk 306B within the arrow 302. The member disk 304D has a reliability factor of high that is higher than the reliability factor of low of the array 302 itself. The reliability factor of high of the member disk 304D is also higher than the reliability factor of low of the spare disk 306B. The reliability factor of low of the spare disk 306B is equal to or higher than the reliability factor of low of the array 302 itself. Therefore, replacing the member disk 304D with the spare disk 306B can be considered as improving the reliability of the spare disks 306, while still maintaining the required reliability of the array 302, the latter because the reliability of the spare disc 306B is at least as great as the reliability of the array 302 itself. The member disk 304D thus becomes a new spare disk.

It is noted that in one embodiment, as depicted in FIG. 3, the spare disk that replaces the member disk 304D is the spare disk 306B instead of the spare disk 306A. Both the spare disks 306 have reliability factors less than that of the member disk 306D and equal to or greater than that of the array 302. However, preference is given to the spare disk that has a reliability factor equal to that of the array 302, or, secondly, that is least higher than the reliability factor of the array 302. Of the two spare disks 306, the reliability factor of the spare disk 306B is equal to that of the array 302, whereas the reliability factor of the spare disk 306A is greater than that of the array 302. Therefore, preference is given to the spare disk 306B replacing the member disk 304D, instead of the spare disk 306A replacing the member disk 304D.

Figure 4:
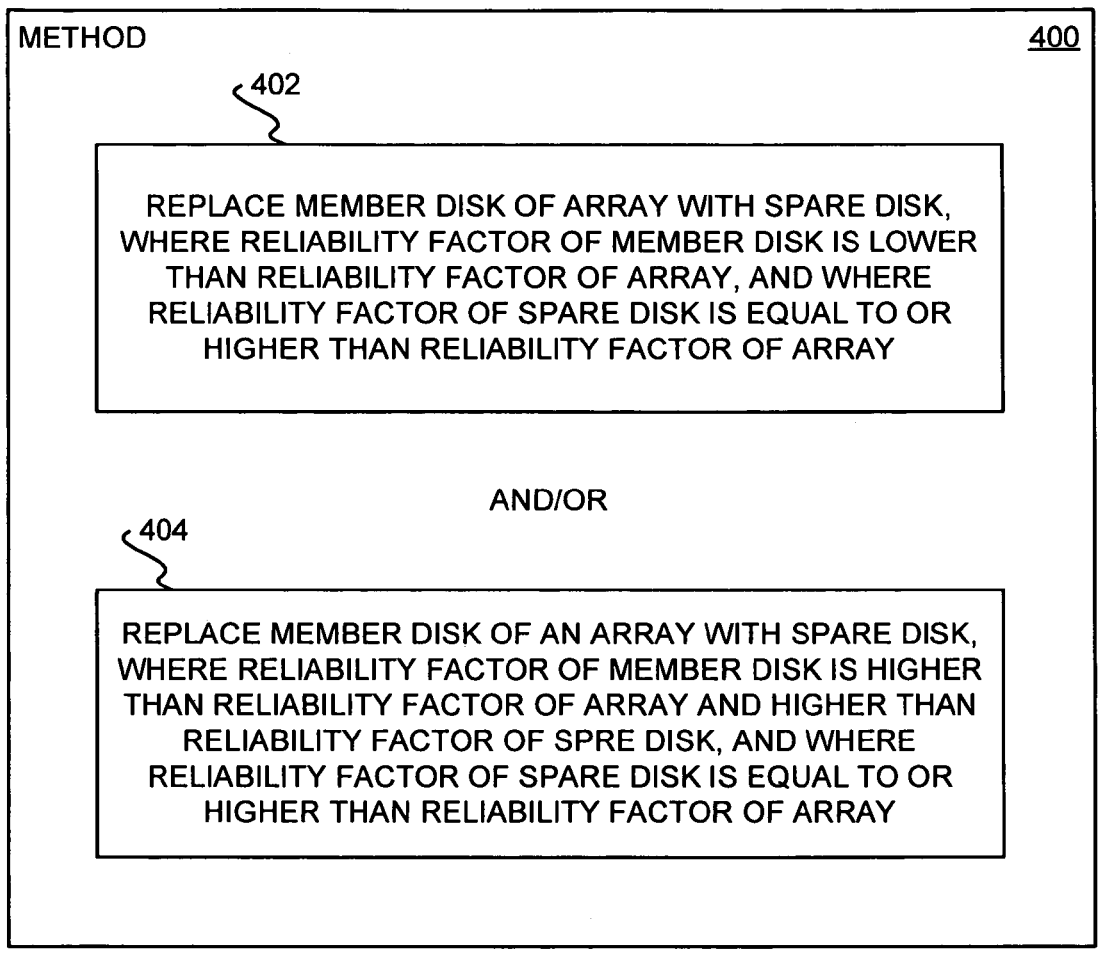
FIG. 4 is a flowchart of a method, according to an embodiment of the invention, and is suggested for printing on the first page of the patent.

FIG. 4 shows a method 400, according to an embodiment of the invention. The method 400 can be performed by the controller 110 that has been described. The method 400 can also be implemented as one or more computer programs stored on a tangible computer-readable medium. The method 400 is desirably repeated for each array of member disks until one or both parts of the method 400 that are being performed can no longer be performed with respect to the member disks' reliability factors, the arrays' reliability factors, and the spare disks' reliability factors. That is, the method 400 can be performed in an iterative manner to optimize the reliability of the arrays in question, until either and/or both parts of the method 400 can no longer be performed.

Thus, in different embodiments, either or both of parts 402 and 404 are performed. A member disk of an array can be replaced with a spare disk (402), where certain conditions are satisfied, as has been described above in relation to FIG. 2. First, the reliability factor of the member disk is lower than the reliability factor of the array. Second, the reliability factor of the spare disk is equal to or higher than the reliability factor of the array. As has also been described above in relation to FIG. 2, the spare disk in question is preferably selected from all the spare disks as the one that has a reliability factor that is equal to or least higher than the reliability factor of the array.

A member disk of an array can also be replaced with a spare disk (404), where different certain conditions are satisfied, as has been described above in relation to FIG. 3. First, the reliability factor of the member disk is higher than the reliability factor of the array. Second, the reliability factor of the member disk is higher than the reliability factor of the spare disk. Third, the reliability factor of the spare disk is equal to or higher than the reliability factor of the array. As has also been described above in relation to FIG. 3, the spare disk in question is preferably selected from all the spare disks as the one that has a reliability factor that is equal to or least higher than the reliability factor of the array.

Figure 5:
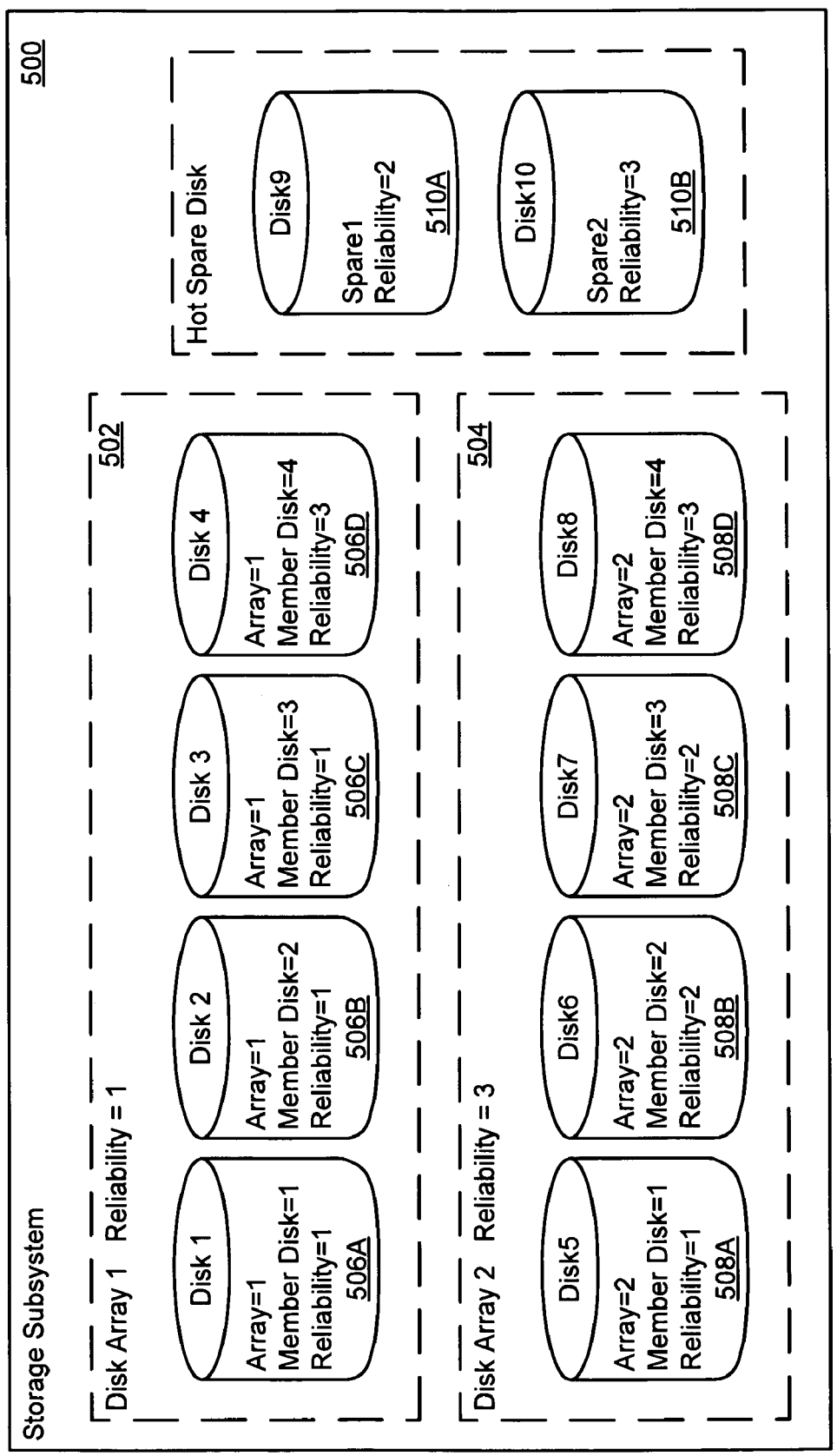
FIGS. 5, 6, and 7 are diagrams depicting how replacing member disks of arrays with spare disks, within a storage subsystem, can maintain reliability factors of the arrays, without having to introduce new spare disks into (or replace existing spare disks of) the storage subsystem, according to an embodiment of the invention.
Figure 6:
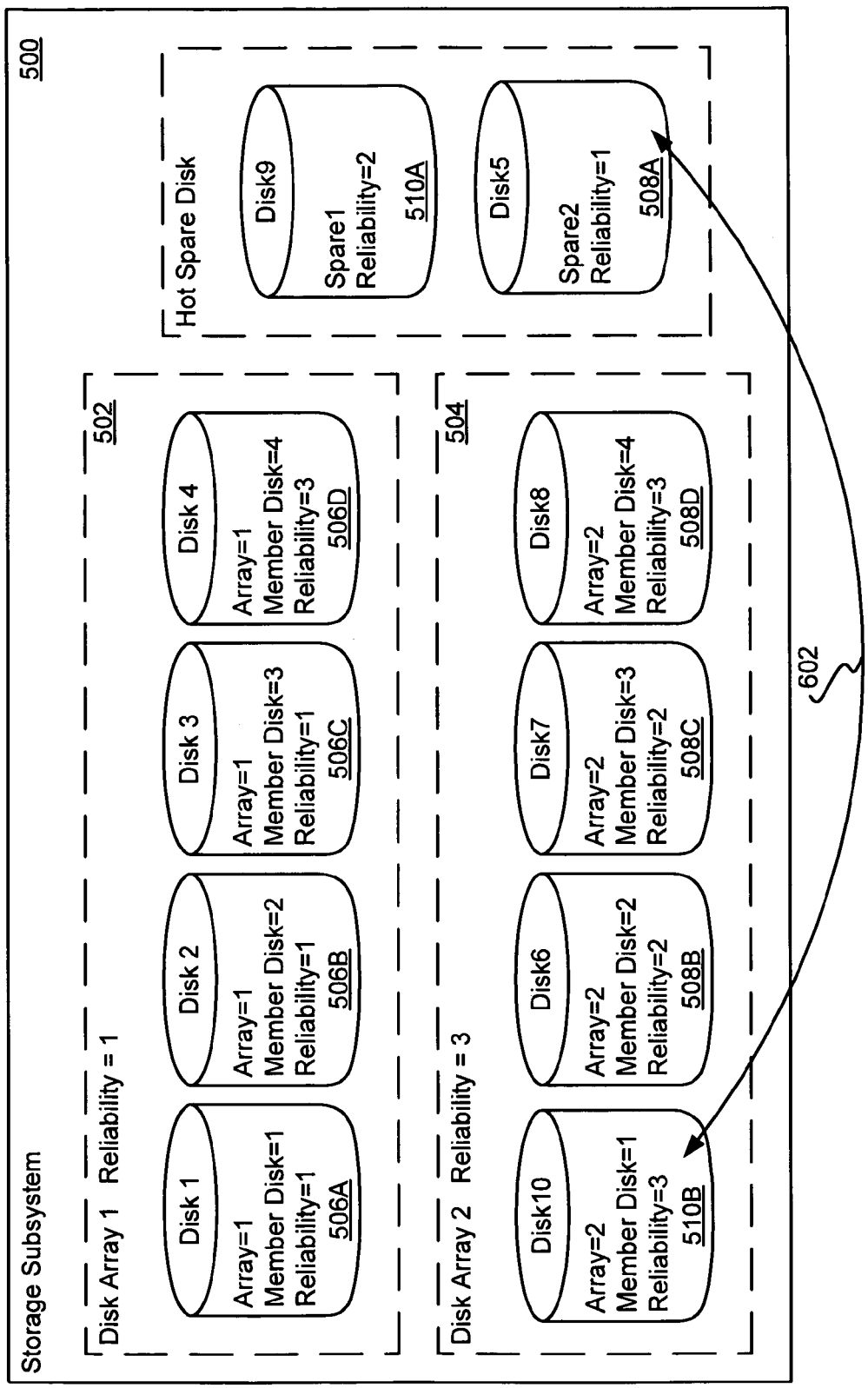
Figure 7:
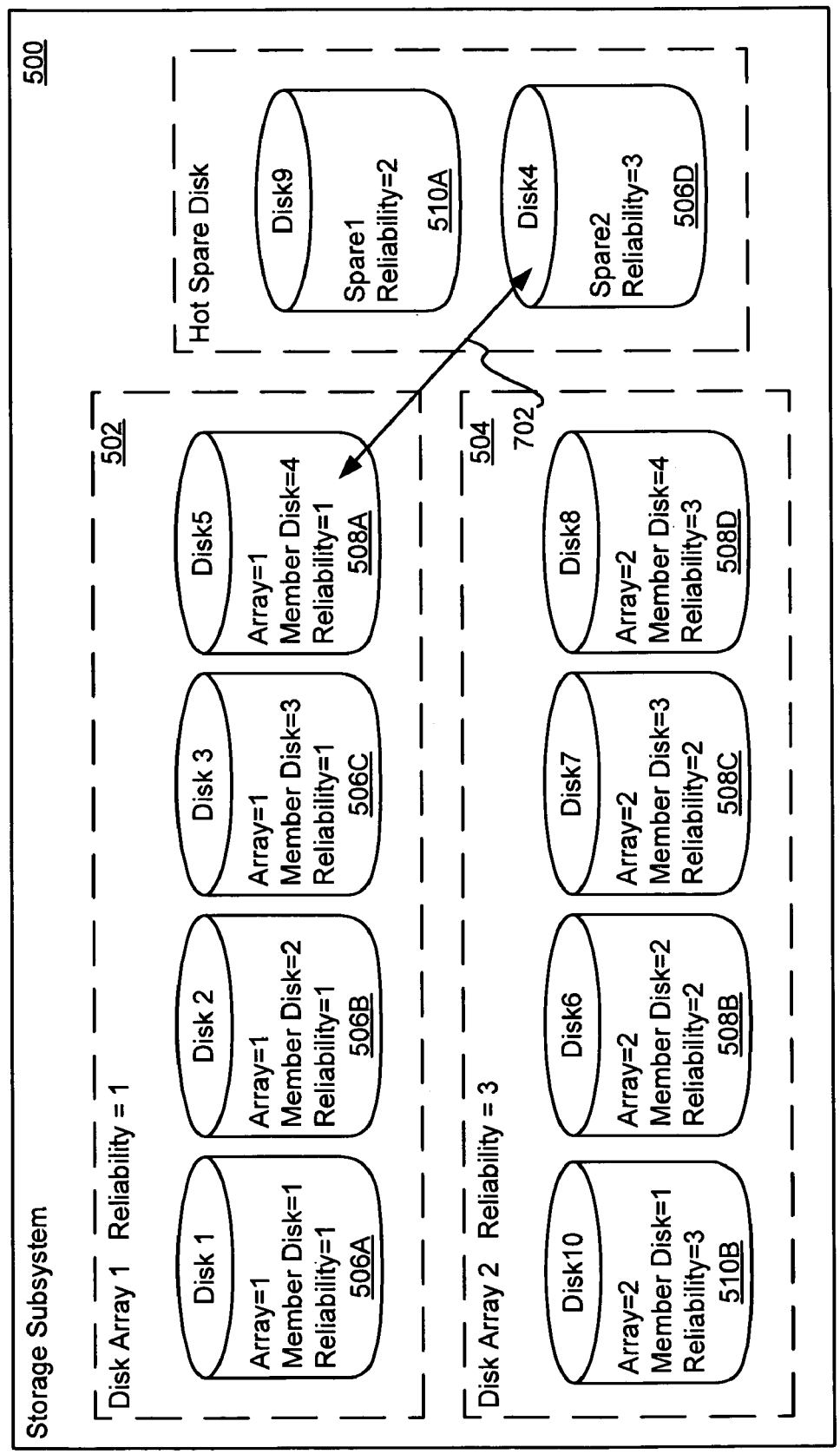

FIGS. 5, 6, and 7 show a storage subsystem 500 in relation to which performance of an embodiment of the invention is described. The subsystem 500 includes two disk arrays 502 and 504. FIGS. 5, 6, and 7 are presented and described to show how an embodiment of the invention makes it possible to maintain the reliability of each disk array 502 and 504, while at the same time minimizing the replacement of a member disk of an array with a completely new disk, as opposed to using one of the existing spare disks.

Referring first to FIG. 5, the disk array 502 initially includes member disks 506A, 506B, 506C, and 506D, collectively referred to as the member disks 506. The disk array 502 has been set or specified by an administrator or other user with a reliability factor of one, and the member disks 506 have reliability factors of one, one, one, and three, respectively. The disk array 504 initially includes member disks 508A, 508B, 508C, and 508D, collectively referred to as the member disks 508. The disk array 504 has been set or specified by an administrator or other user with a reliability factor of three, and the member disks 508 have reliability factors of one, two, two, and three, respectively. There are two "hot" spare disks 510A and 510B, collectively referred to as the spare disks 510, and which have reliability factors of two and three, respectively. In the example of FIGS. 5-7, a reliability factor of X denotes greater reliability than a reliability factor of Y, where Y is greater than X.

It is noted that the reliability factor of member disk 506D is lower than that of the array 502. However, the reliability factors of the spare disks 510 are each lower than that of the array 502, so that the reliability factor of the array 502 cannot be maintained even if the disk 506D is replaced by one of the spare disks 510. In accordance with the prior art, at this point a user would have to replace one of the hot spare disks 510 with another disk that has a sufficiently higher reliability factor.

It is noted further that the reliability factor of member disk 508A is higher than that of the array 504. Therefore, referring to FIG. 6, the disk 508A is replaced within the array 504 with the spare disk 510B, as indicated by the arrow 602. Thus, the array 504 now includes member disks 510B, 508B, 508C, and 508D, whereas there are spare disks 510A and 508A. Through the replacement indicated by the arrow 602, the spare disks now include a spare disk 508A having a higher reliability factor, while at the same time maintaining the reliability factor of the array 504.

It is noted that now the reliability factor of a spare disk, the spare disk 508A, is equal to that of the array 502. Therefore, referring to FIG. 7, the disk 506D is replaced within the array 502 with the new spare disk 508A, as indicated by the arrow 702. Thus, the array 502 now includes member disks 506A, 506B, 506C, and 508A, whereas there are spare disks 510A and 506D. Through the replacement indicated by the arrow 702, it is thus possible to maintain the reliability of the array 502.

The example described in relation to FIGS. 5-7 show how using an embodiment of the invention provides for utilization of the existing disks within a storage subsystem to maintain the reliability factors of the disk arrays, without having to replace any of the disks with another disk from outside of the subsystem. That is, in the conventional approach, the situation shown in FIG. 5 would result in a user having to physically replace one of the spare disks 510 with a disk having a higher reliability factor. By comparison, in accordance with an embodiment of the invention, no such physical replacement of the spare disks 510 is required. Rather, a disk in the second array 504 is "hot swapped" with one of the existing spare disks 510, and the new spare disk can then be "hot swapped" with a disk in the first array 502 to maintain its reliability.

It is noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Therefore, it is manifestly intended that this invention be limited only by the claims and equivalents thereof.

We claim:

1. A method comprising:
    replacing a member disk of an array of member disks with a spare disk, where a reliability factor of the member disk is lower than a reliability factor of the array, and a reliability factor of the spare disk is equal to or higher than the reliability factor of the array; and,
    replacing a member disk of the array of member disks with a spare disk, where a reliability factor of the member disk is higher than the reliability factor of the array and is higher than a reliability factor of the spare disk, and the reliability of the spare disk is equal to or higher than the reliability factor of the array.

2. The method of claim 1, wherein replacing the member disk of the array of member disks with the spare disk, where the reliability factor of the member disk is lower than the reliability factor of the array, and the reliability factor of the spare disk is equal to or higher than the reliability factor of the array, comprises selecting the spare disk from a plurality of spare disks as one that has a reliability factor that is equal to or least higher than the reliability factor of the array.

3. The method of claim 1, wherein replacing the member disk of the array of member disks with the spare disk, where the reliability factor of the member disk is higher than the reliability factor of the array and is higher than the reliability factor of the spare disk, and the reliability factor of the spare disk is equal to or higher than the reliability factor of the array, comprises selecting the spare disk is from a plurality of spare disks as one that has a reliability factor of the spare disk that is equal to or least higher than the reliability factor of the array.

4. The method of claim 1, wherein the array of member disks is a redundant array of independent disks (RAID).

5. The method of claim 1, wherein each member disk is a hard disk drive.

6. The method of claim 1, wherein each spare disk is a hard disk drive.

7. The method of claim 1, wherein each spare disk is a hot spare disk.

8. A system comprising:
    at least two arrays of member disks, each array having a different reliability factor and each member disk of each array having a reliability factor;
    one or more spare disks, each spare disk having a reliability factor; and,
    a controller to, for each array of member disks:
        replace a member disk of the array with one of the spare disks, where the reliability factor of the member disk is lower than the reliability factor of the array, and the reliability factor of the one of the spare disks is equal to or higher than the reliability factor of the array; and,
        replace a member disk of the array with one of the spare disks, where the reliability factor of the member disk is higher than the reliability factor of the array and is higher than the reliability factor of the spare disk, and the reliability of the spare disk is equal to or higher than the reliability factor of the array.

9. The system of claim 8, wherein for each array of member disks, the controller is to at least replace a member disk of the array with one of the spare disks, where the reliability factor of the member disk is lower than the reliability factor of the array, and the reliability factor of the one of the spare disks is equal to or higher than the reliability factor of the array, such that the controller is to select the one of the spare disks as that which has a reliability factor that is equal to or least higher than the reliability factor of the array.

10. The system of claim 8, wherein for each array of member disks, the controller is to at least replace a member disk of the array with one of the spare disks, where the reliability factor of the member disk is higher than the reliability factor of the array and is higher than the reliability factor of the spare disk, and the reliability of the spare disk is equal to or higher than the reliability factor of the array, such that the controller is to select the one of the spare disks as that which has a reliability factor that is equal to or least higher than the reliability factor of the array.

11. The system of claim 8, wherein each array of member disks is a redundant array of independent disks (RAID).

12. The system of claim 8, wherein each member disk is a hard disk drive.

13. The system of claim 8, wherein each spare disk is a hard disk drive.

14. The system of claim 8, wherein each spare disk is a hot spare disk.

15. An article of manufacture comprising:
    a tangible computer-readable medium; and,
    means in the medium for:
        replacing a member disk of an array of member disks with a spare disk, where a reliability factor of the member disk is lower than a reliability factor of the array, and a reliability factor of the spare disk is equal to or higher than the reliability factor of the array; and,
        replacing a member disk of the array of member disks with a spare disk, where a reliability factor of the member disk is higher than the reliability factor of the array and is higher than a reliability factor of the spare disk, and the reliability of the spare disk is equal to or higher than the reliability factor of the array.

16. The article of manufacture of claim 15, wherein the means replaces the member disk of the array of member disks with the spare disk, where the reliability factor of the member disk is lower than the reliability factor of the array, and the reliability factor of the spare disk is equal to or higher than the reliability factor of the array, such that the means selects the spare disk from a plurality of spare disks as one that has a reliability factor that is equal to or least higher than the reliability factor of the array.

17. The article of manufacture of claim 15, wherein the means replaces the member disk of the array of member disks with the spare disk, where the reliability factor of the member disk is higher than the reliability factor of the array and is higher than the reliability factor of the spare disk, and the reliability factor of the spare disk is equal to or higher than the reliability factor of the array, such that the means selects the spare disk from a plurality of spare disks as one that has a reliability factor of the spare disk that is equal to or least higher than the reliability factor of the array.

18. The article of manufacture of claim 15, wherein each array of member disks is a redundant array of independent disks (RAID).

19. The article of manufacture of claim 15, wherein each member disk and each spare disk are hard disk drives.

20. The article of manufacture of claim 15, wherein the spare disk is a hot spare disk.

* * * * *